US006775633B2

(12) United States Patent
Edge (10) Patent No.: US 6,775,633 B2
(45) Date of Patent: Aug. 10, 2004

(54) CALIBRATION TECHNIQUES FOR IMAGING DEVICES

(75) Inventor: Christopher J. Edge, St. Paul, MN (US)

(73) Assignee: Kodak Polychrome Graphics, LLC, Norwalk, CT (US)

( * ) Notice: Subject to any disclaimer, the term of this patent is extended or adjusted under 35 U.S.C. 154(b) by 0 days.

(21) Appl. No.: 10/039,669

(22) Filed: Dec. 31, 2001

(65) Prior Publication Data

US 2003/0125892 A1 Jul. 3, 2003

(51) Int. Cl.[7] .............................. G06F 19/00; H04N 5/74
(52) U.S. Cl. ....................................... 702/107; 348/776
(58) Field of Search ................... 702/107, 85; 348/179, 348/739, 776

(56) References Cited

U.S. PATENT DOCUMENTS

| 4,749,907 A | * | 6/1988 | Boatwright et al. .......... 315/10 |
| 5,276,779 A | | 1/1994 | Statt |
| 5,339,176 A | | 8/1994 | Smilansky et al. |
| 5,363,318 A | * | 11/1994 | McCauley ................... 702/85 |
| 5,371,537 A | | 12/1994 | Bohan et al. |
| 5,561,459 A | * | 10/1996 | Stokes et al. ............... 348/180 |
| 5,619,349 A | * | 4/1997 | Ueda et al. .................. 358/521 |
| 5,638,117 A | * | 6/1997 | Engeldrum et al. ......... 348/179 |
| 5,731,818 A | | 3/1998 | Wan et al. |
| 5,739,809 A | | 4/1998 | McLaughlin et al. |
| 5,739,928 A | | 4/1998 | Scott |
| 5,754,184 A | | 5/1998 | Ring et al. |
| 5,754,222 A | * | 5/1998 | Daly et al. .................. 348/184 |
| 6,088,038 A | | 7/2000 | Edge et al. |
| 6,232,954 B1 | | 5/2001 | Rozzi |

FOREIGN PATENT DOCUMENTS

EP 1 104 175 A2 5/2001

OTHER PUBLICATIONS

"Spyder with PhotoCAL User Guider", Pantone ColorVision, Nov. 2001.*
"Monitor Calibration and Characterization", Ripamonti, K., Colour & Imaging Institute, Derby University, 2001.*
"Color Device Calibration: A Mathematical Formulation", Vrhel et al., IEEE Transactions on Image Processing, 1999.*
Berns et al., "CRT Colorimetry. Part I: Theory and Practice," Color Research and Application, vol. 18, No. 5, pp. 299–313, Oct., 1993.
Berns et al., "CRT Colorimetry. Part II: Metrology," Color Research and Application, vol. 18, No. 5, pp. 315–325, Oct., 1993.
Holub et al., "Color Systems Calibration for Graphic Arts: I: Input Devices," Journal of Imaging Technology, vol. 14, No. 2, pp. 47–52, Apr., 1988.
Holub et al., "Color Systems Calibration for Graphic Arts: II: Output Devices," Journal of Imaging Technology, vol. 14, No. 2, pp. 53–60, Apr., 1988.

(List continued on next page.)

Primary Examiner—Marc S. Hoff
Assistant Examiner—Toan M. Le
(74) Attorney, Agent, or Firm—Shumaker & Sieffert, P.A.

(57) ABSTRACT

The invention is directed to various calibration techniques for calibrating an imagining device such as a display device, a printer, or a scanner. The techniques may involve characterizing the imaging device with a device model such that an average error between expected outputs determined from the device model and measured outputs of the imaging device is on the order of an expected error, and adjusting image rendering on the imaging device to achieve a target behavior. The invention can achieve a balance between analytical behavior of the imaging device and measured output. In this manner, adjustments to image rendering may be more likely to improve color accuracy and less likely to overcompensate for errors that are expected.

24 Claims, 8 Drawing Sheets

OTHER PUBLICATIONS

Gossieaux, "Self–Calibrating Color CRT Displays," Information Display 6/89, pp. 20–23.

Engeldrum et al., "Analysis of White Point and Phosphor Set Differences of CRT Display," Color Research and Application, vol. 15, No. 3, pp. 151–155, Jun., 1990.

Poynton, "Frequently Asked Questions about Gamma," May 28, 1995 Charles A. Poynton. All rights reserved.

Seung–ok et al., "Optimum Brightness Level and Simplified Characterization of CRT Color Monitors," Color Research and Application, vol. 25, No. 6, pp. 408–415, Dec., 2000.

Schlapfer, "How to Test Colour Monitors," Advances in Printing Science and Technology, Proceedings of the $20^{th}$ Research Conference of the International Association of Research Institutes for the Graphic Arts Industry, Moscow, USSR, Edited by W.H. Banks, pp. 118–130, Sep., 1989.

Pearson et al., "A Study of the Relative Tonal Transfer to Soft Copy Output Devices," pp. 196–216.

Masia et al., "Requirements for Soft Copy Proofing", pp. 152–168.

Kane, Jr., "Instrumentation for Monitor Calibration," SMPTE Journal, pp. 744–752, Sep., 1990.

* cited by examiner

CALIBRATION TECHNIQUES FOR IMAGING DEVICES

FIELD

The invention relates to color imaging and, more particularly, to calibration techniques for color imaging devices.

BACKGROUND

Calibration of an imaging device can significantly improve color accuracy of images rendered by the device. For example, imaging devices such as cathode ray tubes, liquid crystal displays, plasma displays, and various printing devices, are often calibrated to determine adjustments that can be applied to either color input or drive data applied to the device. In either case, the adjusted data can then be used to control the imaging device such that the ultimate rendition of the image has improved color accuracy. Calibration can be used to account for drift in the imaging device to improve color accuracy.

For example, the calibration of a cathode ray tube (CRT) may involve attaching a measurement device, such as a colorimeter, to the display screen to measure color output of the CRT. The measured output can then be compared to analytical expected color values to determine the color errors. The determined errors can then be used to modify a lookup table (LUT) in a video card associated with a host computer so that input color data can be converted in a manner that adjusts for the determined errors. The effectiveness and accuracy of the calibration process can substantially impact color accuracy.

Precise color accuracy is particularly important for color intensive applications such as soft proofing. Soft proofing refers to a proofing process that makes use of a display device rather than a printed hard copy. Traditionally, color proofing techniques have relied on hard copy proofing, where proofs are printed and inspected in order to ensure that the images and colors on the print media look visually correct. For instance, color characteristics can be adjusted and successive hard copy prints can be examined in a hard proofing process. After determining that a particular proof is acceptable, the color characteristics used to make the acceptable proof can be reused to mass-produce, e.g., on a printing press, large quantities of print media that look visually equivalent to the acceptable proof.

Soft proofing is desirable for many reasons. For instance, soft proofing can eliminate or reduce the need to print hard copies on media during the proofing process. Moreover, soft proofing may allow multiple proofing specialists to proof color images from remote locations simply by looking at display devices. With soft proofing, there is no need to print and deliver hard copy proofs to remote reviewers. Thus, soft proofing can be faster and more convenient than hard copy proofing. Moreover, soft proofing can reduce the cost of the proofing process. For these and other reasons, soft proofing is highly desirable. The ability to achieve precise calibration of soft proofing display devices is an important factor to achieving an effective soft proofing system.

SUMMARY OF THE INVENTION

In general, the invention is directed to various calibration techniques for calibrating an imaging device such as a display device, a printer or a scanner. The techniques may involve characterizing the imaging device with a device model, wherein an average error between an expected value of the device model and measured output of the image device is on the order of an expected error. The invention can achieve a balance between analytical behavior of the imaging device and measured output. In this manner, adjustments to image data may be more likely to improve color accuracy and less likely to overcompensate for errors that are expected.

In various embodiments, the invention may be directed to methods of calibrating an imaging device. For example, a method may include characterizing the imaging device with a device model such that an average error between expected outputs determined from the device model and measured outputs of the imaging device is on the order of an expected error. The method may also include adjusting image rendering on the imaging device to achieve a target behavior.

In another embodiment, the invention may be directed to a method that includes measuring outputs of the cathode ray tube for a subset of device values of the cathode ray tube, and choosing one or more parameter values of a device model, wherein the number of adjustable parameters is less than a number of measurements used to define the measured output of the cathode ray tube, and wherein an average error between expected outputs of the device model and the measured outputs is on the order of an expected error. The method may further include adjusting image data according to the device model to achieve a target behavior for the imaging device.

In another embodiment the invention may be directed to a method that includes initializing a lookup table (LUT), adjusting settings of the cathode ray tube to substantially achieve a defined output, and measuring output for a number of color values. The method may also include choosing parameter values for a device model, wherein a number of adjustable parameters is less than a number of measured outputs, and generating entries for the LUT based on the device model.

In another embodiment, the invention may implement a technique for biasing an output measurement by an amount sufficient to ensure that the output measurement is within a dynamic range of a measurement device. For example, a method may include measuring output of a display device, and displaying a substantially white trace during measurement to bias the output measurement. The trace may have a halo shape, or any other shape sufficient to properly bias the measurements.

In other embodiments, the invention is directed to calibrated imaging devices or sets of calibrated imaging devices. For example, in accordance with the invention, a cathode ray tube, or a set of cathode ray tubes can be calibrated such that an average color error is approximately less than (0.75 delta e) from an analytical expected color output, and a maximum color error is approximately less than (1.5 delta e) from the analytical expected color output. Furthermore, even more precise calibration, approaching a theoretical limits of analytic equations used to define device behavior can be achieved as described in greater detail below.

Various aspects of the invention may be implemented in hardware, software, firmware, or any combination thereof. If implemented in software, the invention may be directed to a computer readable medium carrying program code, that when executed, performs one or more of the methods described herein.

The invention is capable of providing a number of advantages. In particular, the invention can improve calibration of imaging devices. Moreover, improved calibration can facilitate the realization of color intensive applications such as soft proofing. In some cases, the invention can be used to calibrate imaging devices such that measured errors of the imaging device are on the order of expected errors. For example, expected errors in the measurements may be caused by factors unrelated to the imaging device, such as errors introduced by the measuring device or the video card. The invention can achieve a balance between theory and measurement to ensure that adjustments to image data do not overcompensate for measured errors unrelated to the imaging device itself. In this manner, an imaging device can be calibrated such that an average color error is approximately less than (0.75 delta e) from an analytical expected color output.

Additional details of these and other embodiments are set forth in the accompanying drawings and the description below. Other features, objects and advantages will become apparent from the description and drawings, and from the claims.

DETAILED DESCRIPTION

In the discussion that follows, many aspects of the invention are described with reference to the calibration of an imaging device in the form of a cathode ray tube (CRT). However the invention is not necessarily limited in that respect. For example, techniques according to the principles of the invention may be readily applicable to other imaging devices, including other display devices such as liquid crystal displays, plasma displays, projection displays, and the like; printing devices such as printing presses, laser printers, ink-jet printers, dot-matrix printers, or any other printing device; and other imaging devices such as scanners. Accordingly, the detailed discussion is meant to be an exemplary description of one detailed embodiment in accordance with the invention.

Figure 1:
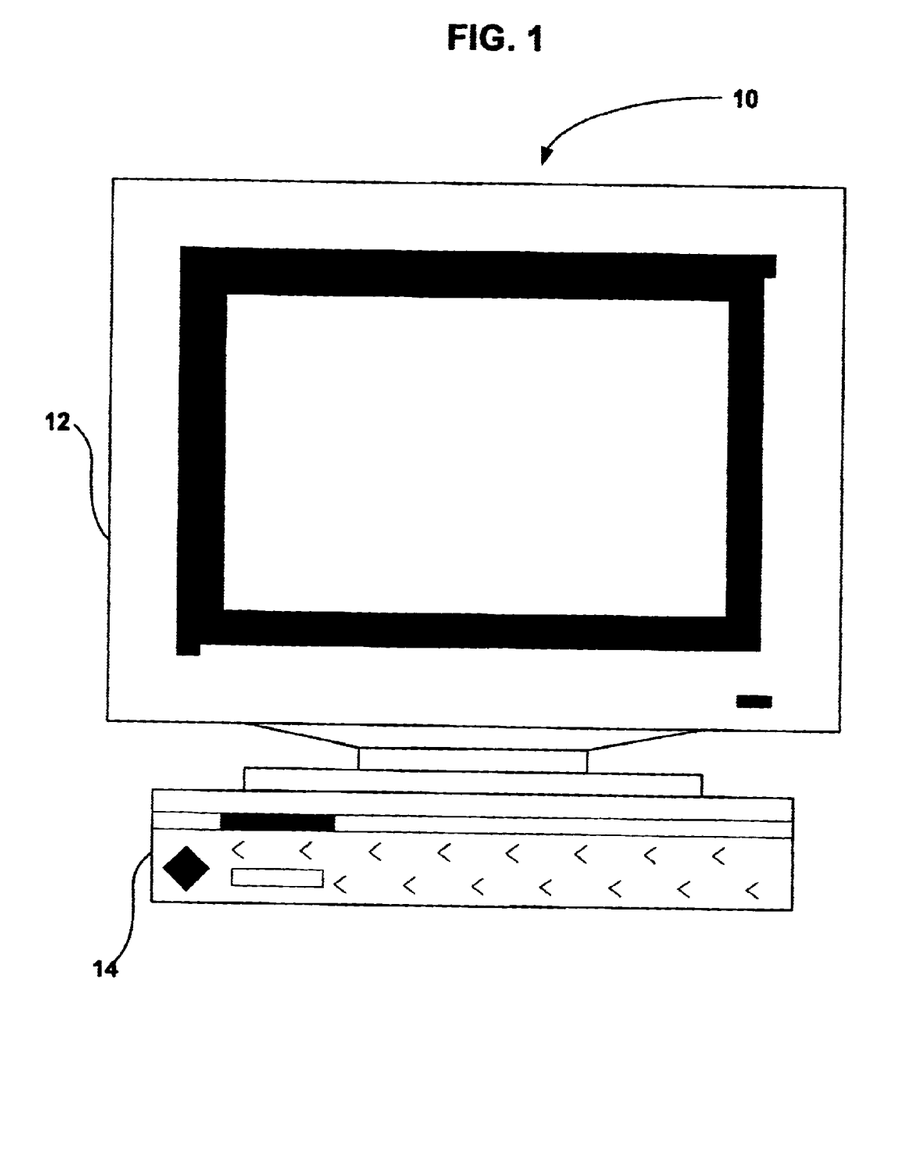
FIG. 1 is a front view of an exemplary imaging station including a cathode ray tube calibrated according to the invention.

FIG. 1 is a front view of an exemplary imaging station 10. Imaging station 10 includes an imaging device in the form of a cathode ray tube (CRT) 12. In addition, imaging station 10 includes a computer 14 that can receive image data and drive CRT 12 according to the received image data. Imaging station 10 utilizes one or more of the calibration techniques described herein to improve rendering of color imagery on CRT 12. In accordance with the invention, CRT 12 can be calibrated such that an average color error is approximately less than (0.75 delta e) from an analytical expected color output, and a maximum color error is approximately less than (1.5 delta e) from the analytical expected color output. More specifically, in some cases CRT 12 can be calibrated such that an average color error is approximately between (0.3 delta e) and (0.75 delta e) from the analytical expected color output, or even approximately between (0.3 delta e) and (0.4 delta e) from the analytical expected color output. In that case, the maximum color error may be approximately between (0.6 delta e) and (1.1 delta e) from the analytical expected color output, or even approximately between (0.6 delta e) and (0.8 delta e) from the analytical expected color output. In other words, the invention can facilitate calibration accuracy of an imaging device that approaches a theoretical limit.

Computer 14 may substantially conform to conventional computers used by graphic artists and other users in the creation of graphic imagery for electronic display or print production. For example, computer 14 may include a processor, memory, and an external storage device. A memory/bus controller and system bus typically couple the processor and memory, while one or more I/O controllers and an I/O bus couple the processor and memory to the storage device and CRT 12. Computer 14 may also include a user input device coupled to the processor an memory via an I/O bus.

The processor of computer 14 may take the form of a general purpose microprocessor and can be integrated with or form part of a PC, Macintosh, computer workstation, or the like. The user input device of computer 14 may include a conventional keyboard and pointing device such as a mouse, pen, or trackball, if desired. The memory of computer 14 may include random access memory (RAM) storing program code that is accessed and executed by the processor to carry out the calibration techniques described below.

For example, program code implementing calibration techniques according to the invention can be loaded into the memory of computer 14 from the external storage device of computer 14, which may take the form of a fixed hard drive or removable media drive. The program code can be initially carried on computer-readable media such as magnetic, optical, magneto-optic or other disk or tape media. Alternatively, the program code may be loaded into memory from electronic computer-readable media such as electrically-erasable-programmable-read-only-memory (EEPROM), or downloaded over a network connection. If downloaded, the program code may be initially embedded in a carrier wave or otherwise transmitted on an electromagnetic signal. The program code may be embodied as a feature in an application program providing a wide range of imaging functionality.

Figure 2:
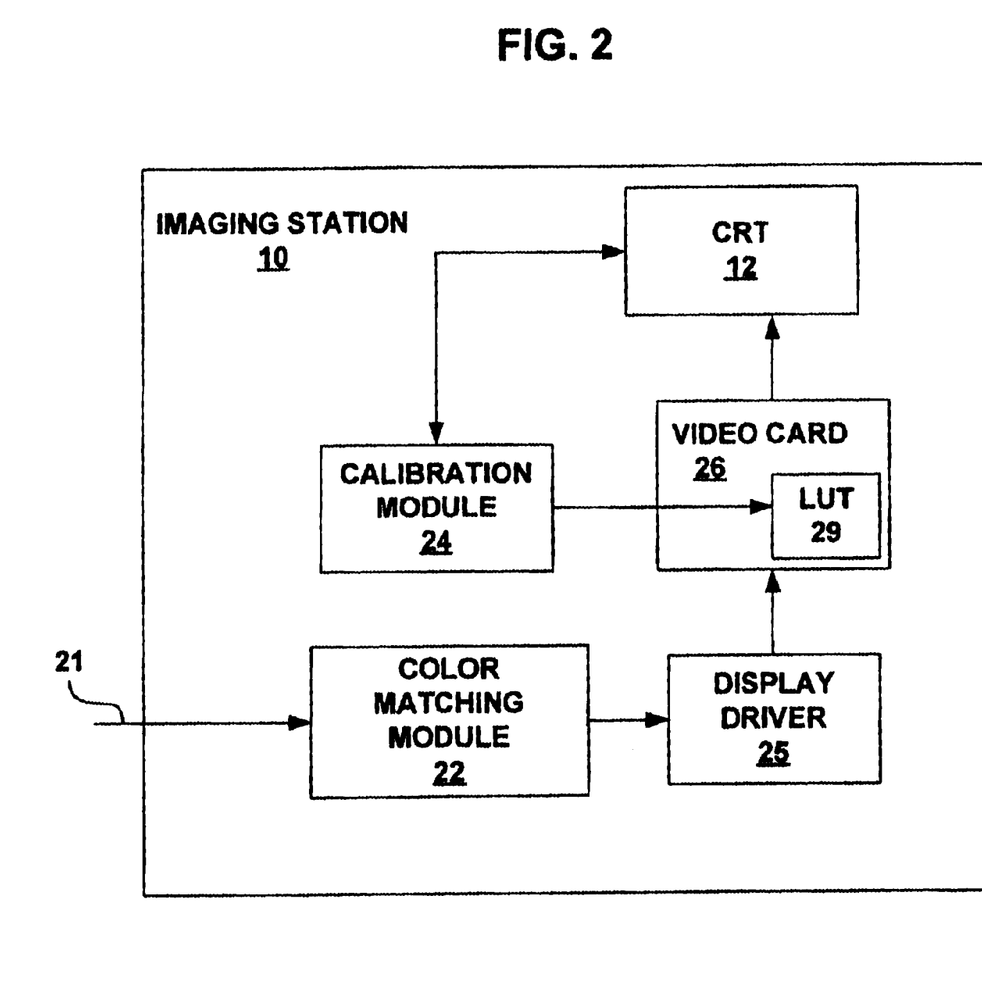
FIG. 2 is a functional block diagram of an exemplary implementation of an imaging station according to the invention.

FIG. 2 is functional block diagram of an exemplary implementation of a imaging station 10 according to the invention. The various functional blocks may be implemented in hardware, or may be implemented in software which is executed in a processor within computer 14 as mentioned above.

Imaging station 10 receives red-green-blue (RGB) image data as indicated at reference numeral 21. Upon receiving RGB image data, the data can be manipulated by color matching module 22. In particular, color matching module may convert the RGB data using a color profile associated with the specific make and model of CRT 12. The converted data can then be sent through display driver 25 and video card 26 to ultimately drive the pixels of CRT 12 in a manner that yields a very accurate rendition of color images.

To further improve color accuracy, imaging station 10 includes a calibration module 24 to calibrate CRT 12 in order to account for such things as drift in CRT 12. Calibration module 24 can be invoked to measure output of CRT 12, and then, adjustments can be loaded into LUT 29 within video card 26. Video card 26 accesses LUT 29 to convert image values into drive values to be applied to CRT 12. These additional adjustments can be applied to the image data so that the ultimate rendition of CRT 12 has more accurate color.

Calibration module 24 may invoke the calibration techniques described in greater detail below in order to achieve improved color accuracy. Typically, when a calibration technique is invoked, calibration module 24 prompts a user A gamma value can be chosen as a standard target. For example, a gamma value of 2.2 is often assumed for uncorrected CRT displays and is reasonably linear with respect to L*, i.e., in the L*a*b* color space. As described in greater detail below, calibration module 24 may implement techniques that can match this gamma behavior approximately to within an expected error.

The matrix of EQUATION 1 can be redefined using standard values of chromaticity for R, G and B and for Yxy (luminance and chromaticity) of the white point of CRT 12. The matrix M for converting RGB to XYZ can be defined according to the chromaticities of the RGB values as follows:

$$M(x_{rl}, y_{rl}, x_{gl}, y_{gl}, x_{bl}y_{bl}, x_{wp}, y_{wp}) = M_c(x_{rl}, y_{rl}, x_{gl}, y_{gl}, x_{bl}y_{bl}) \begin{pmatrix} Y_{rl}(x_{wp}, y_{wp}) & 0 & 0 \\ 0 & Y_{gl}(x_{wp}, y_{wp}) & 0 \\ 0 & 0 & Y_{bl}(x_{wp}, y_{wp}) \end{pmatrix} \text{ where}$$

EQUATION 3

$$M_c(x_{rl}, y_{rl}, x_{gl}, y_{gl}, x_{bl}y_{bl}) = \begin{pmatrix} x_{rl}/y_{rl} & x_{gl}/y_{gl} & x_{bl}/y_{gl} \\ 1 & 1 & 1 \\ (1-x_{rl}-y_{rl})/y_{rl} & (1-x_{gl}-y_{gl})/y_{gl} & (1-x_{bl}-y_{bl})/y_{bl} \end{pmatrix} \text{ and}$$

EQUATION 4

$$\begin{pmatrix} Y_{rl}(x_{wp}, y_{wp}) \\ Y_{gl}(x_{wp}, y_{wp}) \\ Y_{bl}(x_{wp}, y_{wp}) \end{pmatrix} = M_c^{-1} \begin{pmatrix} x_{wp}/y_{wp} \\ 1 \\ (1-x_{wp}-y_{wp})/y_{wp} \end{pmatrix}$$

EQUATION 5 to attach a color measurement device to CRT 12. For example, the color measurement device is typically a high quality light detector that can be affixed to the display screen of CRT 12. Device number DTP92, commercially available from X-Rite Incorporated of Grand Rapids, Mich. is one suitable measurement device. After, the color measurement device has been affixed to the display screen of CRT 12, a user can initiate the calibration process. In that case, calibration module 24 performs a number of measurements on the output of CRT 12. After measuring the output of CRT 12, calibration module 24 can define a device model of CRT, and use the device model to generate adjusted values that can be loaded into LUT 29. In this manner, the calibration procedure can account for drift in CRT 12 and thereby improve color accuracy of images rendered on CRT 12.

Calibration module 24 may begin with a presumption that CRT 12 is calibrated to a reference RGB color space having a perfect gamma curve behavior:

$$\begin{pmatrix} X_1 \\ Y_1 \\ Z_1 \end{pmatrix} = \begin{bmatrix} X_{rl} & X_{gl} & X_{bl} \\ Y_{rl} & Y_{gl} & Y_{bl} \\ Z_{rl} & Z_{gl} & Z_{bl} \end{bmatrix} \begin{pmatrix} f_{rl}(R) \\ f_{gl}(G) \\ f_{bl}(B) \end{pmatrix}$$

EQUATION 1 where $$f_{r1}(R) = R^{\gamma 1}$$

EQUATION 2A $$f_{g1}(G) = G^{\gamma 1}$$

EQUATION 2B $$f_{b1}(B) = B^{\gamma 1}$$

EQUATION 2C

EQUATIONS 1, 2A, 2B and 2C have normalized RGB values between 0.0 and 1.0. However, display values captured in the calibration process typically have 0–255 gray level values.

In order to achieve a particular targeted luminance for white $Y_{wp}$ in units of candelas/meter$^2$, the matrix M can be multiplied by $Y_{wp}$. Thus, EQUATION 1 can be rewritten as:

$$\begin{pmatrix} X_1 \\ Y_1 \\ Z_1 \end{pmatrix} = Y_{WP1}M(X_{WP1}, Y_{WP1}) \begin{pmatrix} f_{r1}(R) \\ f_{r1}(G) \\ f_{r1}(B) \end{pmatrix}$$

EQUATION 6 where the values of RGB chromaticities are assumed to be constants.

Experimental data gathered on several dozen CRTs, ranging in age from zero to eight years old, has indicated that the RGB chromaticities tend to remain very constant over time and between brands of CRTs. Thus, the variables that require adjustment are primarily the Yxy white point and the RGB gamma curves of the CRT. However, more complex adjustments which include changes in RGB chromaticities can also be performed as desired.

The measured behavior of an uncalibrated CRT can be defined as follows:

$$\begin{pmatrix} X \\ Y \\ Z \end{pmatrix} = \begin{pmatrix} X_{dc} \\ Y_{dc} \\ Z_{dc} \end{pmatrix} + Y_{wp2}M(X_{wp2}, Y_{wp2}) \begin{pmatrix} f_{r2}(R) \\ f_{g2}(G) \\ f_{b2}(B) \end{pmatrix}$$

EQUATION 7 where $$f_{r2}(R) = \left[\frac{(R - R_{o2})}{(1.0 - R_{o2})}\right]^{\gamma r2}$$

EQUATION 8A $$f_{g2}(G) = \left[\frac{(G - G_{o2})}{(1.0 - G_{o2})}\right]^{\gamma r2}$$

EQUATION 8B $$f_{b2}(B) = \left[\frac{(B - B_{o2})}{(1.0 - B_{o2})}\right]^{\gamma r2}$$

EQUATION 8C

The vector $XYZ_{dc}$ is the dark current offset introduced by the measurement device plus stray light. Typical values for the X-Rite DTP92 measurement device are on the order of 0.3 candelas/meter$^2$, compared with the white point luminosity of 81.5 candelas/meter$^2$.

The values of $RGB_{o2}$ represent the black onsets, which indicate the threshold values of RGB above which an increase in XYZ can be detected. For perfect CRT behavior (as represented in EQUATION 1) the values of $RGB_{o2}$ are zero. The vector $XYZ_{dc}$ may by a constant or may vary as a function of $(1.0-\alpha)$ where:

$$\alpha=(XYZ(RGB)-XYZ(RGB=0))/(XYZ(RGB=255)-XYZ(RGB=0)) \quad \text{EQUATION 9}$$

For example, for some measurement devices, the value of XYZ for RGB=0 can vary significantly, while the value of XYZ for RGB=255 is very stable and repeatable. Thus, for some measurement devices the value of $XYZ_{dc}$ can be multiplied by $(1.0-\alpha)$.

Figure 3:
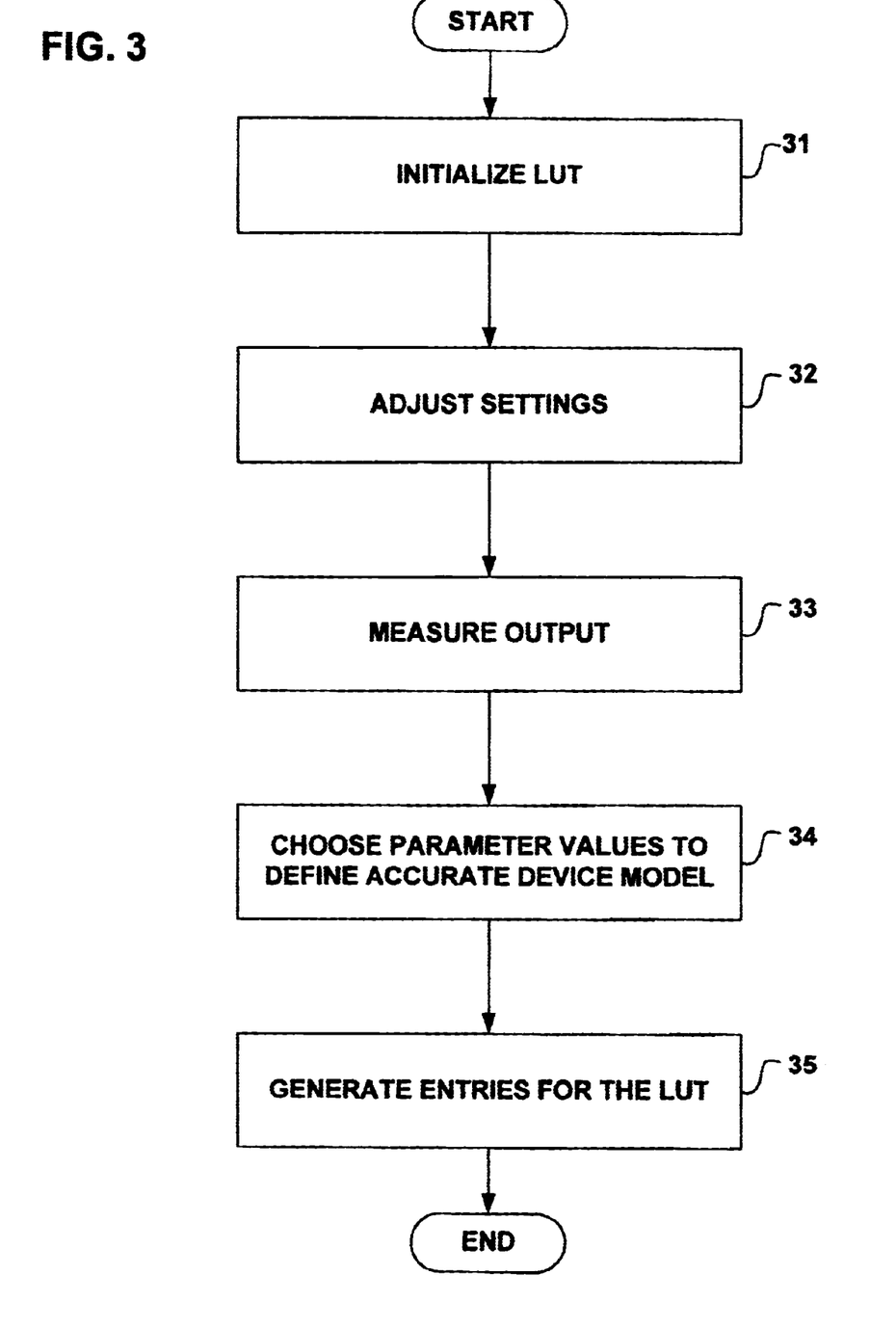
FIG. 3 is a flow diagram illustrating a calibration technique according to the invention.

FIG. 3 is a flow diagram illustrating a calibration technique according to an embodiment of the invention. As shown, calibration module 24 initializes LUT 29 within video card 26 (31). In other words, LUT 29 is set to linear in order to ensure that the output of CRT 12 is in a known state. Exemplary pseudo code for the initialization is provided below.

define numEntries 1024
define max16bit 0xffff
unsigned short videoLUT [numEntries];
int i;
(for i=0; i<numEntries;i++)
   videoLUT[i]=(unsigned short)(0.5+max16bit*((float)i/(float)(numEntries-1)));

Although this linear video LUT will be altered during the calibration procedure, it is advantageous to ensure that videoLUT[0] is always kept at 0. This will ensure that the measured value of RGB=0 is a constant throughout the calibration process.

After the LUT has been initialized (31), the settings of CRT 12 can be adjusted (32), either automatically by calibration module 24 or manually by a user. Adjusting the analog settings of CRT 12 further ensures that the initial state of CRT 12 is known and defined. As mentioned above, the state of the RGB target space can be defined by white point and gamma values for RGB, assuming the RGB chromaticities are constant. The values of the analog settings are typically referred to by the following names. Contrast refers to the setting that adjusts primarily the luminance of the near white colors for the CRT (which affect RGB values together), and secondarily affect dark luminance values. Brightness refers to the setting that adjusts primarily the luminance of the dark luminance colors for the CRT (which affect RGB values together), and secondarily affects near white values. Gain refers to the setting that adjusts similar values as contrast, but does so separately for each R, G, and B channel. Bias refers to the setting that adjusts similar values as brightness, but does so separately for each R, G, and B channel.

The above analog settings can be set either manually, e.g., using input buttons, dials and the like presented by CRT 12, or automatically via direct communication between computer 14 and CRT 12. An example of such direct communication is the Video Electronics Standards Association (VESA®) standard known as ddc/ci. In one specific implementation, the values of contrast, brightness, and the gains and biases of R, G, and B can be adjusted to achieve the following measured behavior:

1) The value of Yxy for white (RGB=255) is set as close as possible to the target values of Yxy with the exception that the value of Y is set slightly (i.e. 1%) higher than the value of Y for the white of the RGB target space. This allows room to perform remaining corrections via LUT 29 in video card 26. The target value of Yxy for white can be chosen by the user according to the preferences or needs of the user.

2) The value of x,y for a dark gray (e.g. RGB=50) is set as close as possible to the value of x,y for the target white. Again, how the target is defined may depend on the preferences of the user.

3) The luminosity Y of the dark gray can be adjusted in one of two ways that are essentially equivalent. In one case, the dark gray luminosity is set such that the value of brightness is as high as possible while still measuring perfect black at RGB=0. "Perfect black" is defined as the value of Y for the CRT with RGB=0, and all analog adjustment values set to minimum. In the other case, the highest value of brightness is determined which results in a value of the black onsets of $RGB_{o2}=0$ or slightly above 0.

For some CRT's, the gamma value is approximately 2.35. In that case, it has been found that the desired value of brightness occurs when L*=13.0–14.0 at RGB=48. The relative values of RGB bias can be adjusted to measure a*=b*=0. In that case, all calculations for CIELAB assume that XnYnZn is determined by the value Yxy of the white point of the RGB target for CRT 12.

After adjusting the settings (32), output of CRT 12 is measured (33). For example, calibration module 24 may direct the user to attach a calibration device to the screen of the CRT to measure output. When the measurement device is attached, calibration module 24 can perform a calibration routine that involves displaying and measuring color samples. For example, data capturing may involve displaying and measuring RGB gray values ranging from 0 to 255. All of the gray levels can be measured, or alternatively, a subset of gray levels can be measured in order to reduce the time it takes to capture data. Measurements in 15 gray level increments can provide a suitable level of accuracy. Each gray level defines a unique "neutral color." Neutral colors refer to colors having substantially equivalent color values. For example, neutral colors for a CRT are colors having substantially equivalent values for the R, G, and B channels.

The calibration routine may display a circle representing RGB neutral color (typically a circle with a ten centimeter diameter or larger) against a black (RGB=0) background. The black background can help improve the ability to measure the darker colors. A number of XYZ values can be captured for each RGB value that is displayed in order to obtain an estimate of measurement variability, i.e., an error value (sigma) associated with the measurement device. The calibration routine can then proceed to display the next RGB value and repeat the process until all RGB values, or a subset thereof, have been captured.

One concern in measurement of dark emissive colors is that some measurement devices clip the data. In other words, for some measurement devices, values of X, Y, or Z in the range of RGB=0 to RGB=40 may be returned as 0 when a truly accurate value would be finite but small, e.g. 0.4 candelas/meters$^2$. To compensate for clipping in the measurement device, it may be advantageous to display a substantially white trace during the calibration routine to slightly bias the measurement device. The white trace may be a fixed white circle (or halo) having color values of RGB-255. The scattered light from this halo is a constant non-zero quantity and can offer the beneficial effect of adding a slight bias to the values of XYZ measured in darker colors. Hence, all values of RGB from 0 to 255 measured in this manner can be guaranteed to be within the dynamic range capabilities of the measurement device.

Figure 4:
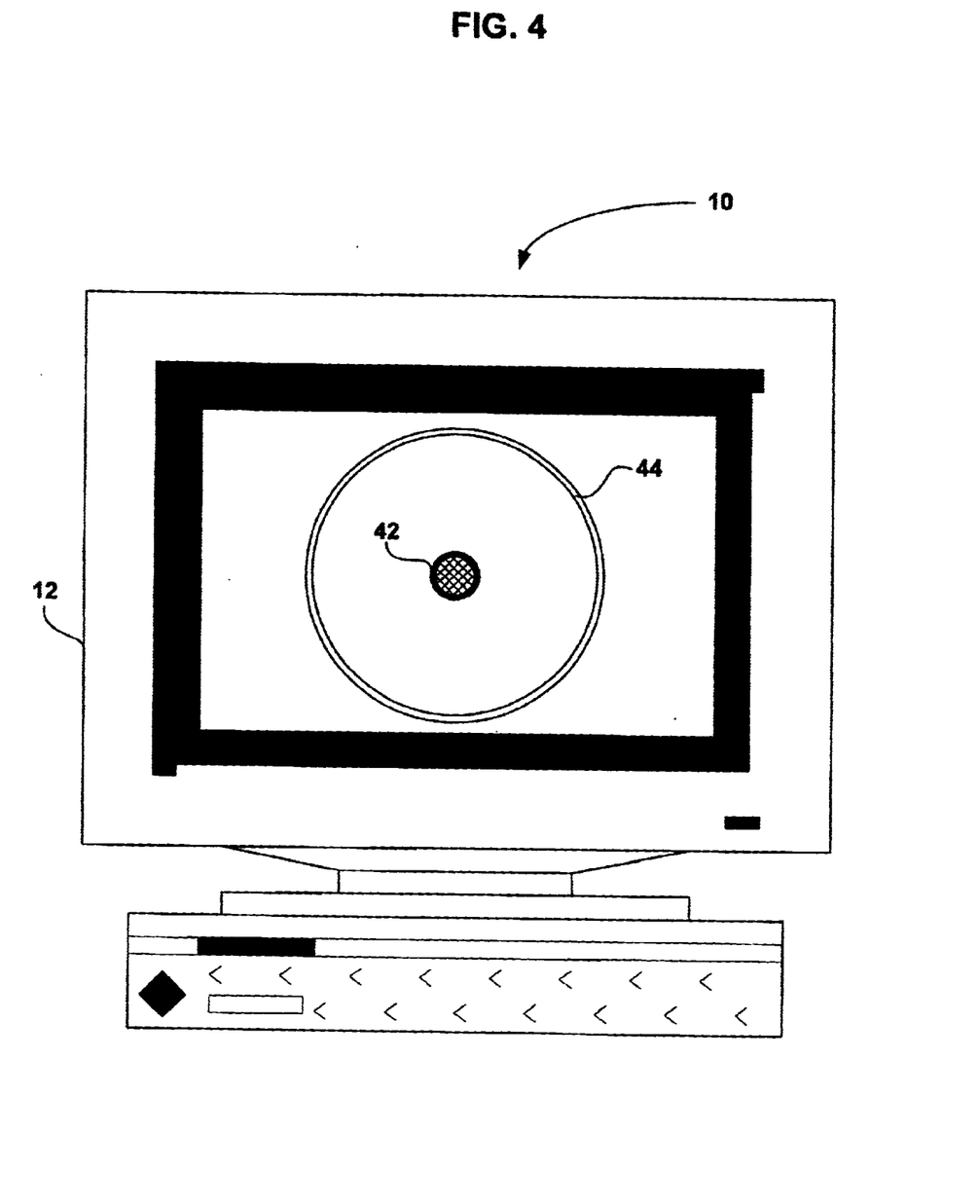
FIG. 4 illustrates one example of an imaging station displaying a white trace during calibration.

FIG. 4 illustrates one example of an imaging station 10 displaying a white trace during calibration. Measurement device 42 can be affixed to the display screen of CRT 12, and substantially white trace 44 can be displayed during the calibration procedure to bias the measurements in order to ensure that the values of RGB from 0 to 255 are within the dynamic range capabilities of measurement device 42. The color being measured may fill the interior of white trace 44, or alternatively both the color being measured and a black background may be included in the interior of white trace 44. In either case, white trace 44 can be used to provide a desired amount of biasing. For example, biasing the output measurements by approximately 0.5 to 1.0 percent is usually sufficient. However, depending on the measurement device, a larger amount of bias may be useful. White trace 44 is illustrated as having a halo shape, but could be implemented with any shape or design. Also, biasing with other colors may be useful for some measurement devices.

After the output has been properly measured (33), the parameter values of the device model are chosen (34). The number of adjustable parameters can be defined in the device model to be less than a number of measurements used to define the measured output of cathode ray tube 12. By defining the number of parameters to be less than, or substantially less then the number of measurements used to define the measured output, it can be ensured that the calibration process will not overcompensate for measured results. In other words, there is always some level of error that can be attributed to the measurement device or other external factors. The invention can avoid improperly compensating for external factors unrelated to the actual device output by limiting the number of adjustable parameters to be less than, or substantially less then the number of measurements used to define the measured output. Specifically, the invention can avoid adjusting each input according to the measured output for that given input. Rather, the invention may implement a device model based partially in theory and partially on chosen parameter values. In this manner, adjustments do not overcompensate for measured errors that should be expected. Values for the adjustable parameters can be chosen during the calibration process in a manner that minimizes the error between analytical expected outputs and measured outputs.

Which parameters are defined as adjustable may depend on the implementation. Indeed, for different imaging devices, the adjustable parameters would typically be different. However, in the example of calibrating CRT 12, the adjustable parameters may be a gamma value and a black onset value. The gamma value refers to the value of a well know parameter in the art ($\gamma$) that indicates the rate of change in light intensity with change in digital device value. The black onset value is another well know term in the art, which refers to the point at which there is a measurable increase in light.

The parameter values of the device model can be chosen by an error minimization process in order to define a robust device model that is accurate to an extent approaching theoretical limits. In one example, the device model of a CRT is defined using the following process. First, the captured XYZ data is adjusted with respect to a dark current bias. In particular, the dark current bias ($XYZ_{dc}$ defined above) of the XYZ data can be subtracted from the raw measured XYZ data. If the value of $XYZ_{dc}$ is a constant for a particular measurement device or method of measurement, then the value of $XYZ_{dc}$ can simply be subtracted from all values of XYZ. However, if the value of $XYZ_{dc}$ varies according to the XYZ value, the adjustment to the XYZ data should be performed accordingly. The result of this adjustment to the XYZ data is that the value of $XYZ_{dc}$ in EQUATION 7 is zero. Thus, only the remaining parameters must be determined in order to accurately characterize the CRT behavior.

Next, the white point values are set. For example, the values of $(Yxy)_{wp2}$ can be plugged into EQUATION 7 above. In that case, for $(Yxy)_{wp2}$, the values of $XYZ_{wp2}$ are given by the XYZ data at RGB=255, and the definitions for x and y are:

$$x = X/(X+Y+Z) \quad \text{EQUATION 10A}$$

$$y = Y/(X+Y+Z) \quad \text{EQUATION 10B}$$

Next, an error function can be defined that depends on the chosen parameter values, in this case the gamma and black onset parameter values. For example, an error function can be defined as follows:

$$Error(\gamma_{r2}, \gamma_{g2}, \gamma_{b2}, RBG) = \sum_{i=0}^{i=N-1} \Delta E_i^2(\gamma_{r2}, \gamma_{g2}, \gamma_{b2}, RGB_{o2}) \text{ where} \quad \text{EQUATION 11}$$

$$\Delta E_i^2(\gamma_{r2}, \gamma_{g2}, \gamma_{b2}, RGB_{o2}) = \quad \text{EQUATION 12}$$
$$(L^*(RGB_i, \gamma_{r2}, \gamma_{g2}, \gamma_{b2}, RGB_{o2}) - L_i^*)^2 +$$
$$(a^*(RGB_i, \gamma_{r2}, \gamma_{g2}, \gamma_{b2}, RGB_{o2}) - a_i^*)^2 +$$
$$(b^*(RGB_i, \gamma_{r2}, \gamma_{g2}, \gamma_{b2}, RGB_{o2}) - b_i^*)^2$$

$L^*(\ )$, $a^*(\ )$ and $b^*(\ )$ are the analytical expected values of $L^*a^*b^*$, whereas the values $L^*_i$, $a^*_i$, $b^*_i$ are the measured values of $L^*a^*b^*$. The analytical expected values and measured CIELAB values can be derived from analytical and measured XYZ. The analytical expression for X, Y, and Z, as a function of RGB, $XYZ_{dc}$, $\gamma_{r2}$, $\gamma_{g2}$, $\gamma_{b2}$, $RGB_{o2}$, is defined in EQUATION 6 and EQUATION 7 above. The calculation for CIELAB values from XYZ is given by:

$$L^* = 116 f(Y/Y_n) - 16 \quad \text{EQUATION 13A}$$

$$a^* = 500[f(X/X_n) - f(Y/Y_n)] \quad \text{EQUATION 13B}$$

$$b^* = 200[f(Y/Y_n) - f(Z/Z_n)] \quad \text{EQUATION 13C}$$

where $$f(w) = \begin{cases} (w)^{1/3} & \text{for } w > 0.008856 \\ 7.787(w) + 16/116 & \text{for } w \leq 0.008856 \end{cases} \quad \text{EQUATION 14}$$

The values of $RGB_i$ and $XYZ_i$ are the corresponding values of displayed RGB and measured XYZ for each input value of RGB ranging from 0 to 255. The summation performed above from i=0 to i=N−1 assumes a list or array of (N) XYZ measured values and their corresponding N values of RGB used to generate the measured color. RGB=0 may be excluded in this calculation due to the possibility of a singularity or non-linearity of behavior in the region near or at RGB=0. In other words, not including RGB=0 in this calculation can ensure that the overall RGB to XYZ behavior of the CRT behavior is being characterized without being skewed by behavior at or near RGB=0.

At this point, values for the parameters can be determined by error minimization. For example, an error minimization can be performed on the adjustable parameter using any suitable error minimization method such as a chi-squared method or a least squares fit. Other error minimization techniques could also be used. In any case, nominal initial values for the chosen parameters can be used (in this case gamma=2.2 and black onset=0.05). After the error minimization has been performed, calibration module 24 may check the average and maximum error between the measured data and the analytical expected behavior that has been calculated.

Experiments have shown that typical values for average error range from 0.3–0.5 delta e and that maximum errors range from 0.6–1.0 delta e. These errors appear to be due to systematic quantization errors in the analog-to-digital (A/D) and digital-to-analog (D/A) circuitry of the video card and the measurement device causing +/− shifts in XYZ as a smooth function of RGB. The sigma of noise of measurement for a particular RGB color is typically quite low, e.g., 0.1 delta e. Thus, it should be expected that this quantization error should be evenly distributed about the perfect gamma curve behavior. Hence, although the average and maximum errors from analytical expected behavior may be slightly larger than variability due to random measurement noise, one should expect that the sum of the residuals should be close to zero.

To even further improve the error minimization, additional techniques can be employed. For example, error minimization routines sometimes do not find the best minimum for the error function. In particular, a fatal error can occur in the minimization routine, such as divergence rather than convergence. To avoid this, it may be advantageous to find the best estimates possible for the initialization of the parameter values in order to ensure that the error function is as near minimum as possible to its ultimate value.

One way to pre-optimize the parameter values discussed above is to measure a smaller set of data for each channel separately and to calculate and minimize the error of the separate channels first. In this approach, a smaller set of single channel data is obtained, i.e., the other two channels are set to 0 during data capture. Additionally, the predictions for L*a*b* can be performed with two of the three RGB values set to 0. Finally, the error minimization can be performed only on the parameters for that one channel. These additional techniques can better insure that the error minimization technique will indeed identify parameter values that minimize the error between analytical calculations and measured behavior.

Once the parameter values of the device model are chosen (34), calibration module 24 can create and load entries into LUT 29 (35). In this manner, LUT 29 can adjust the image data to account for drift in CRT 12. LUT 29 may be in the form:

$$R' = f_r^{-1}(R) = R_{o2} + (R_{max2} - R_{o2})R^{\gamma r1/\gamma r2} \quad \text{EQUATION 15A}$$

$$G' = f_g^{-1}(G) = G_{o2} + (G_{max2} - G_{o2})G^{\gamma g1/\gamma g2} \quad \text{EQUATION 15B}$$

$$B' = f_g^{-1}(B) = B_{o2} + (B_{max2} - B_{o2})B^{\gamma b1/\gamma b2} \quad \text{EQUATION 15C}$$

At this point all the values of EQUATIONS 15A–15C are known with the exception of $RGB_{max2}$. To obtain the values for $RGB_{max2}$, the expressions for the uncalibrated CRT indicated by EQUATIONS 7 and 8A–8C can be equated with the expression for the desired CRT behavior indicated by EQUATION 6 after substituting R'G'B' for RGB in the expressions for the uncalibrated CRT. In other words, one can attempt to predict how close to the desired CRT behavior the uncalibrated CRT will be after the adjustments stored in video LUT 29 are applied. Substituting these expressions for R'G'B' into EQUATIONS 7 and 8A–8C yields the following:

$$\begin{pmatrix} X \\ Y \\ Z \end{pmatrix} = \begin{pmatrix} X_{dc} \\ Y_{dc} \\ Z_{dc} \end{pmatrix} + Y_{wp2}M(X_{wp2}, Y_{wp2})\begin{pmatrix} f'_{r2}(R) \\ f'_{g2}(G) \\ f'_{b2}(B) \end{pmatrix} \quad \text{EQUATION 16}$$

where $$f'_{r2}(R) = \left[\frac{(R_{max} - R_{o2})}{(1.0 - R_{o2})}\right]^{\gamma r2} R^{\gamma r1} \quad \text{EQUATION 17A}$$

$$f'_{g2}(G) = \left[\frac{(G_{max} - G_{o2})}{(1.0 - G_{o2})}\right]^{\gamma g2} G^{\gamma g1} \quad \text{EQUATION 17B}$$

$$f'_{b2}(B) = \left[\frac{(B_{max} - B_{o2})}{(1.0 - B_{o2})}\right]^{\gamma b2} B^{\gamma b1} \quad \text{EQUATION 17C}$$

Equating EQUATION 16 with EQUATION 6 for the ideal CRT behavior with a gamma of 2.2, with additional measured dark current bias added yields the following:

$$\begin{pmatrix} X_{dc} \\ Y_{dc} \\ Z_{dc} \end{pmatrix} + Y_{wp1}M(X_{wp1}, Y_{wp1})\begin{pmatrix} f_{r1}(R) \\ f_{g1}(G) \\ f_{b1}(B) \end{pmatrix} = \quad \text{EQUATION 18}$$

$$\begin{pmatrix} X_{dc} \\ Y_{dc} \\ Z_{dc} \end{pmatrix} + Y_{wp2}M(X_{wp2}, Y_{wp2})\begin{pmatrix} f'_{r2}(R) \\ f'_{g2}(G) \\ f'_{b2}(B) \end{pmatrix}$$

which can be reduced to:

$$\begin{pmatrix} f'_{r2}(R) \\ f'_{g2}(G) \\ f'_{b2}(B) \end{pmatrix} = \frac{Y_{wp1}}{Y_{wp2}} M^{-1}(x_{wp}, y_{wp2})M(x_{wp1}, y_{wp1})\begin{pmatrix} f_{r1}(R) \\ f_{g1}(G) \\ f_{b1}(B) \end{pmatrix} \quad \text{EQUATION 19}$$

The product of the matrices is diagonal, and results in the following three equations:

$$f'_{r2}(R) = \frac{Y_{wp1}Y_{wpR1}}{Y_{wp2}Y_{wpR2}} f_{r1}(R) \quad \text{EQUATION 20A}$$

$$f'_{g2}(G) = \frac{Y_{wp1}Y_{wpG1}}{Y_{wp2}Y_{wpG2}} f_{g1}(G) \quad \text{EQUATION 20B}$$

$$f'_{b2}(B) = \frac{Y_{wp1}Y_{wpB1}}{Y_{wp2}Y_{wpB2}} f_{b1}(B) \quad \text{EQUATION 20C}$$

$RGB_{max2}$ can now be obtained by substituting EQUATIONS 2A–2C and EQUATIONS 17A–17C into EQUATIONS 20A–20C as follows:

$$\left[\frac{(R_{max} - R_{o2})}{(1.0 - R_{o2})}\right]^{\gamma r2} R^{\gamma r1} = \frac{Y_{wp1}Y_{wpR1}}{Y_{wp2}Y_{wpR2}} R^{\gamma r1} \quad \text{EQUATION 21A}$$

$$\left[\frac{(G_{max} - G_{o2})}{(1.0 - G_{o2})}\right]^{\gamma g2} G^{\gamma g1} = \frac{Y_{wp1}Y_{wpG1}}{Y_{wp2}Y_{wpG2}} G^{\gamma g1} \quad \text{EQUATION 21B}$$

$$\left[\frac{(B_{max} - B_{o2})}{(1.0 - B_{o2})}\right]^{\gamma b2} B^{\gamma b1} = \frac{Y_{wp1}Y_{wpB1}}{Y_{wp2}Y_{wpB2}} B^{\gamma b1} \quad \text{EQUATION 21C}$$

and solving for $R_{max}$, $G_{max}$ and $B_{max}$ as follows:

$$R_{max} = R_{o2} + (1.0 - R_{o2})\left[\frac{Y_{wp1}Y_{wpR1}}{Y_{wp2}Y_{wpR2}}\right]^{1/\gamma r2} \quad \text{EQUATION 22A}$$

$$G_{max} = G_{o2} + (1.0 - G_{o2})\left[\frac{Y_{wp1}Y_{wpG1}}{Y_{wp2}Y_{wpG2}}\right]^{1/\gamma_{g2}} \quad \text{EQUATION 22B}$$

$$B_{max} = B_{o2} + (1.0 - B_{o2})\left[\frac{Y_{wp1}Y_{wpB1}}{Y_{wp2}Y_{wpB2}}\right]^{1/\gamma_{b2}} \quad \text{EQUATION 22C}$$

The values of EQUATIONS 22A–22C can then be substituted into EQUATIONS 15A–15C to define entries of LUT 29. The procedure can be repeated as desired, each time using a correction function calculated from EQUATIONS 15A–15C from a previous iteration. In other words, the adjustments may be implemented as a closed loop such that the adjustment values continue to converge with each iteration of the procedure. The procedure may be repeated each day, or may be repeated as desired. For example, it may be advantageous to repeat the procedure before a contract proof image is displayed. Experiments have shown that typically CRTs drift by only 1.0 to 3.0 delta e over an approximately 24 hour period. Thus, for many applications one calibration per day is adequate.

Additionally, intelligent process control may be implemented such as by calculating the adjustment to the most recent correction function, and performing a partial correction rather than a full correction. The degree of correction can be adjusted based on the noise of measurement versus the magnitude of error. Additionally, intelligent process control may be implemented by correcting the most recent correction function only when the average and/or max errors exceed a predetermined value.

The target Yxy value for white can often be achieved to an acceptable level by automatic adjustment of the CRT analog parameters as described above. Optionally, calibration module 24 can adjust the gammas and onsets without modifying the maximum correction values. Likewise, the onsets may be minimized by optimization of the CRT analog parameters. In that case, the calibration method described above can be used to adjust only the gamma behavior of the RGB channels in order to ensure accurate gray balance. Even if adjustments are performed on each RGB channel for the black onset, gamma, and max value, minimizing the magnitude of adjustment for black onset and max value is desirable when limited by an 8 bit video LUT in order to minimize the effects of quantization.

If the choice of the analog settings is used to calibrate the system white point to a value close to the target white value (for example, no more than +/−0.5 delta e error in L*, a*, or b* using the target white value for $X_nY_nZ_n$) there are at least two ways to characterize the gamma curve properties of the system. One way is to set the white point of the analytical model to the value of the measured white point of the CRT system after the analog selections are performed. This should result in a gamma curve for R, G, and B that is minimized in error with respect to a "relative white" reference target. In other words a target that is exactly 2.2 gamma for R, G, and B, and a white point equal to the current white of the CRT, i.e. close to but not exactly the target value of Yxy.

Another way to characterize the gamma curve properties of the system is to set the white point of the analytical model to the desired target value for the white point of the CRT system. When this approach is used, the calculated model will always have a small error relative to the measured data at RGB=white. However, the overall model may obtain a better fit to the measured data. This means that small errors in the white point will to some extent be accounted for in the overall analytical model for the CRT. Consequently, the final gamma curve of the system should have a minimized error with respect to the "absolute white" reference target, i.e. the reference target that has 2.2 gamma for R, G, and B as well as a white point that is that desired target white point of the system.

Additional setting conditions for the CRT that can be checked before performing the above procedure may include the following. First, all values of the RGB reference space in the equations above should be less than or equal to the values of Y for the physical RGB device being calibrated. Second, all values of the RGB onsets for the physical RGB device being calibrated should be in a "correctable" range. For example, with current CRT technology, an estimate for what constitutes "correctable" is $5<RGB_{o2}<40$ in units of gray levels. Third, all values of $XYZ_{dc}$ should be positive to avoid clipping, and should be below a "reasonable" level. In that case, with current CRT technology, an estimate of what constitutes "reasonable" is 0.5 candellas/meter$^2$ The first setting condition simply means that the maximum values of RGB can always be reduced in order to hit the target, but cannot exceed 100% if the intensity of a channel is too low. The second setting condition can ensure that a good black (RGB=0) can always be achieved. The third setting condition can ensure that the measurement device, plus stray light, plus CRT minimum luminance values are reasonably low. The CRT white point should be set close to the vicinity of the targeted white point such that the maximum adjustment values of RGB for the RGB device being calibrated are in the range of 0.95<RGBmax<1.0.

Figure 5:
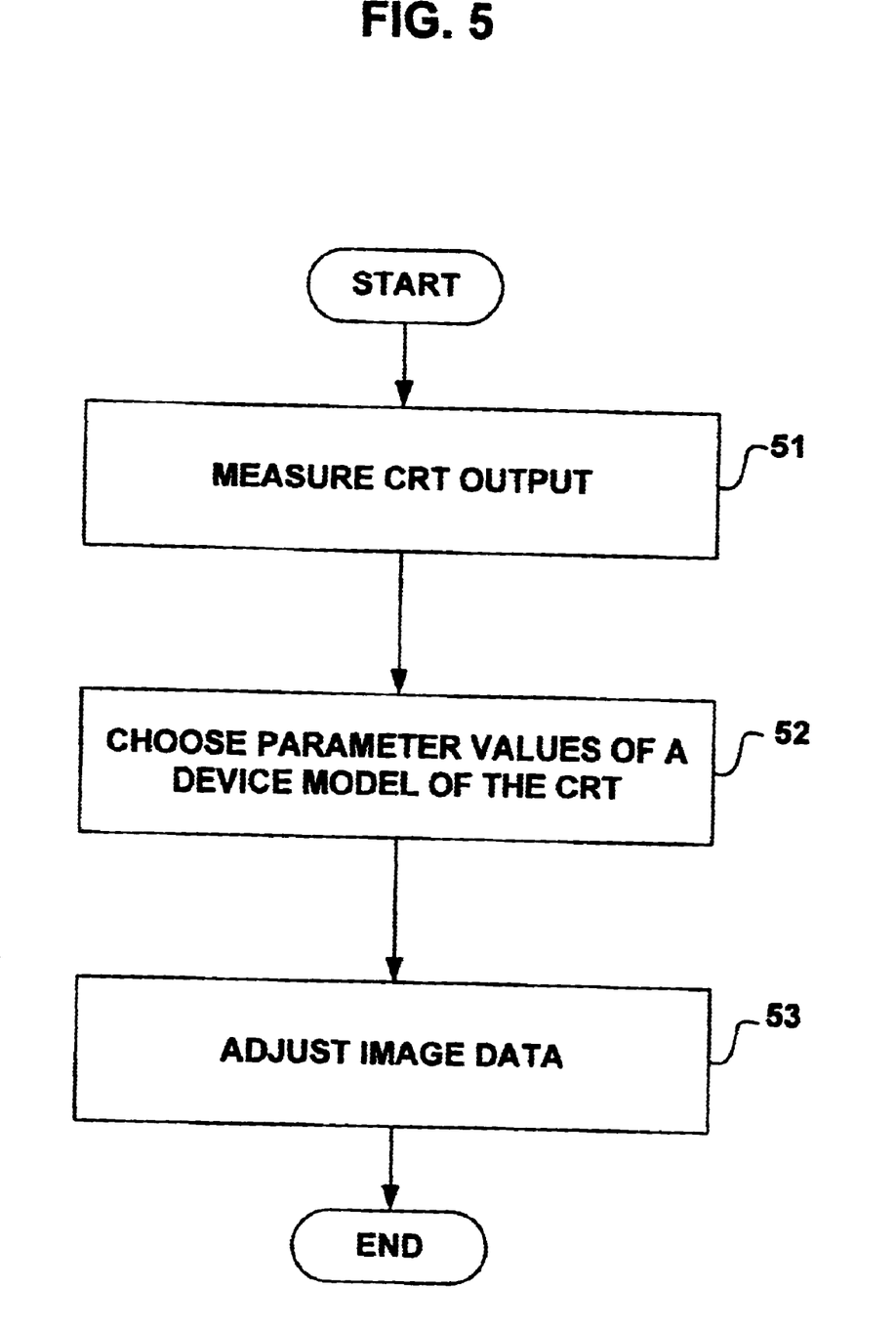
FIGS. 5 and 6 are additional flow diagrams illustrating calibration techniques according to the invention.

FIG. 5 is another flow diagram illustrating a more general overview of a calibration technique for a CRT according to the invention. As shown, the output of a CRT is measured (51). Then, parameter values of a device model of the CRT are chosen (52). Finally, image data is adjusted so that output of the CRT is more accurate (53).

In particular, when the number of adjustable parameters of the CRT is established to be less than a number of measurements of the CRT, calibration can be improved. For example, rather than adjusting each input of the CRT according to a measured output, i.e., a one-to-one mapping of input and measurements, the invention establishes a device model that has fewer adjustable parameters than the number of measured outputs. In this manner, the technique does not overcompensate for measured results that have errors which would be expected. In other words, even after applying an adjustment to input at the video card, one should expect small errors due to factors unrelated to drift in the CRT such as, inaccuracies in the measuring device. The invention can achieve a balance between analytical modeling and empirical measurement so as not to overcompensate for measured errors that should be expected.

By using the techniques described herein, improved calibration of CRTs can be achieved. Specifically, the techniques described herein can be used to calibrate a display such that an average color error is approximately less than (0.75 delta e) from an analytical expected color output and a maximum color error is approximately less than (1.5 delta e) from the analytical expected color output. More specifically, average color errors approximately between (0.3 delta e) and (0.75 delta e) from the analytical expected color output and maximum color errors approximately between (0.6 delta e) and (1.1 delta e) from the analytical expected color output can be achieved. Even more specifically, average color errors approximately between (0.3 delta e) and (0.4 delta e) from the analytical expected color output and the maximum color errors approximately between (0.6 delta e) and (0.8 delta e) from the analytical expected color output have been achieved. Average colors errors approaching (0.3 delta e) approach the theoretical limits that can be achieved with the current state of CRTs and measurement devices. As measurement devices and CRTs improve, however, the theoretical limits of calibration may also improve. In that case, the invention may achieve even better average errors and maximum color errors.

Figure 6:
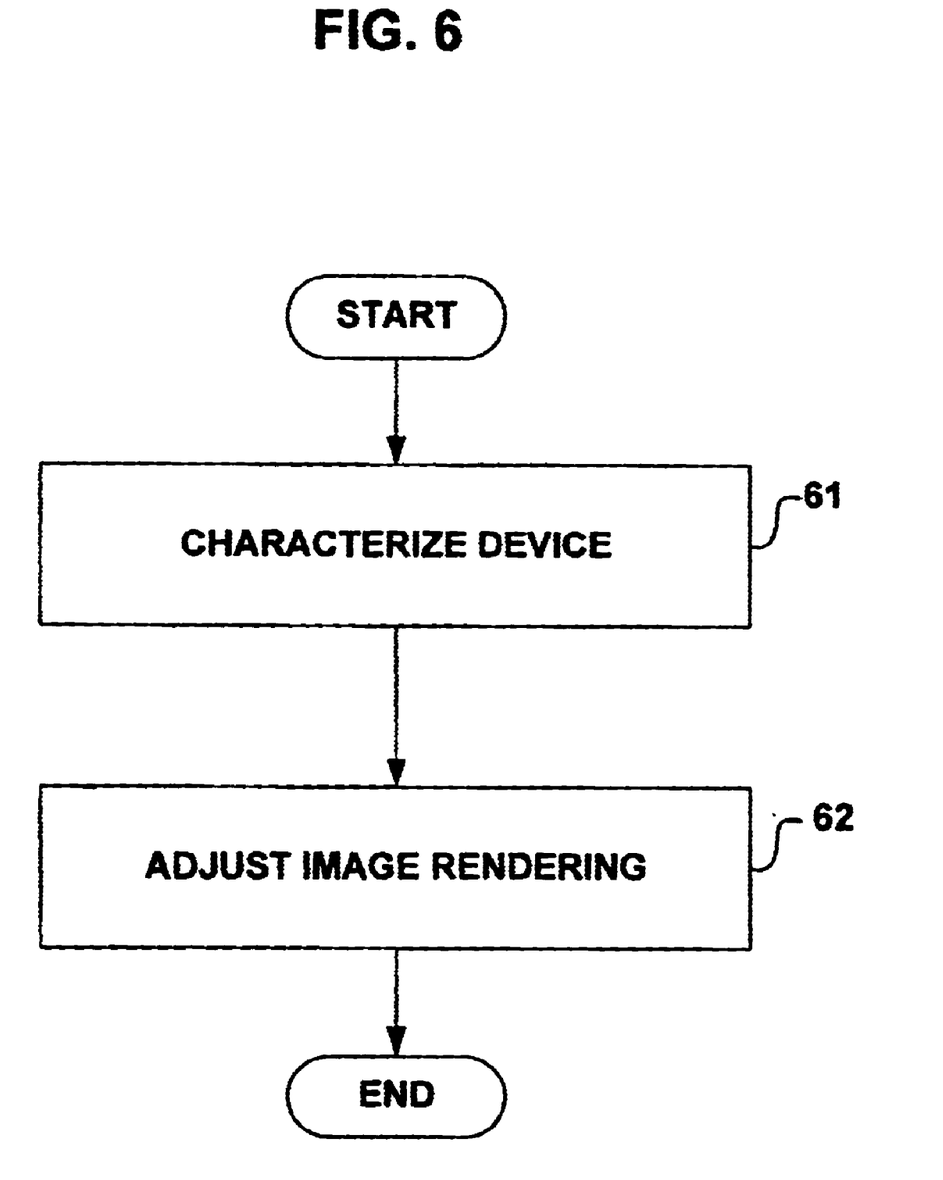

FIG. 6 is another flow diagram generally illustrating a calibration technique that can be applied to any imaging device in accordance with the invention. As shown, the imaging device is characterized with a device model (61). In that case, an average error between an analytical expected value of the device model and a measured output of a subset of device values of the imaging device can be made on the order of an expected error. Furthermore, in some cases, a subset of device values substantially corresponding to neutral colors may comprise the output. After characterizing the imaging device (61), the image rendering by the imaging device can be adjusted to achieve a target behavior (62). For example, adjusting the imaging rendering comprises adjusting image data, such as by using a LUT or by creating dynamic color profiles as described below with reference to FIG. 7.

The device model used to characterize the imaging device may include one or more adjustable parameters. In that case, the technique may further include choosing adjustable parameters of the device model. Also, the number of chosen parameters may be less than a number of measurements used to define the measured output of the imaging device. For example, in the case where the imaging device is a CRT, the adjustable parameters may comprise a gamma value and a black onset value. However, in other examples, the parameters can be specified according to the imaging device.

Figure 7:
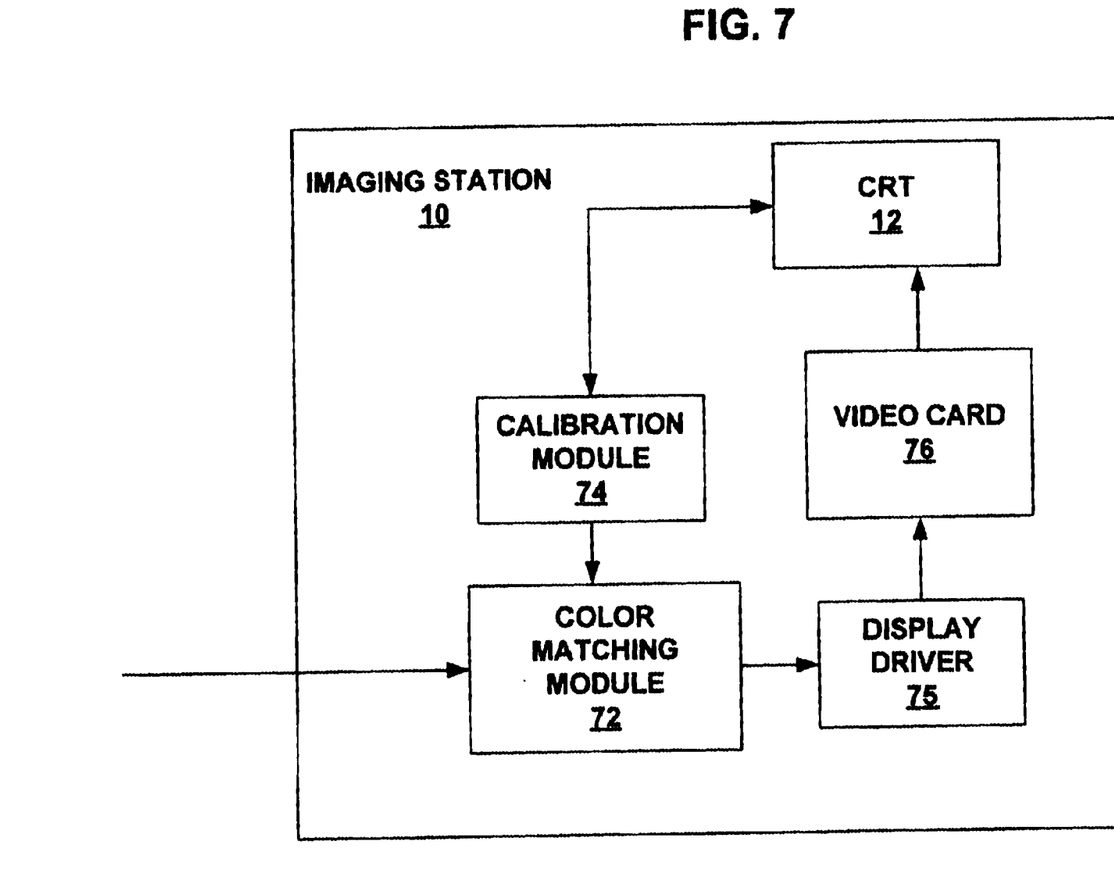
FIG. 7 is another functional block diagram of an exemplary implementation of an imaging station according to the invention.

FIG. 7 illustrates an alternative embodiment of imaging station 10. In this case, the same calibration techniques can be used to calibrate CRT 12. However, rather than apply the adjustments using a LUT, this embodiment creates dynamic color profiles in color matching module (CMM) 72. In other words, after calibration module 74 has performed the calibration procedure, the adjustment to account for drift in CRT 12 can be applied by generating dynamic color profiles in CMM 72. The color profiles are dynamic in the sense that they change with calibration measurements. Thus, as CRT 12 drifts, the dynamic color profile may change. In other words, CMM 72 may receive the calibration data from calibration module 74 and can incorporate the calibration information into a device profile specifically for CRT 12. Adjusted image data can then be fed through display driver 75 and video card 76, possibly without any additional adjustments. In this manner, the need for a LUT within video card 76 can be avoided.

Figure 8:
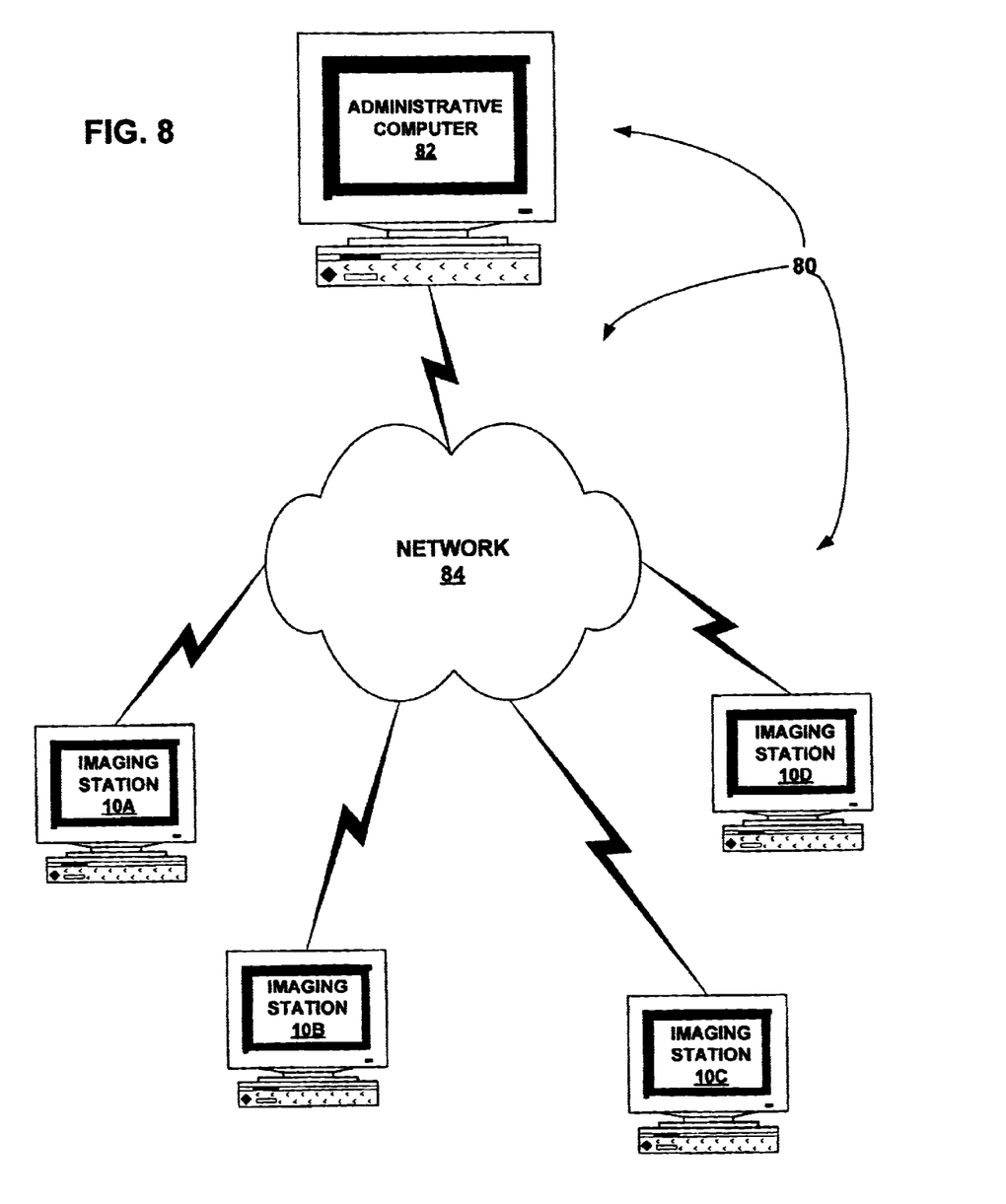
FIG. 8 is a block diagram of an exemplary soft proofing system including a number of imaging stations implementing the invention.

FIG. 8 illustrates a soft proofing system 80. Soft proofing system 80 may implement one or more aspects of the invention to realize accurate color rendering and color matching in a soft proofing process. Soft proofing system 80 includes an administrative computer 82. Administrative computer 82 can be thought of as a server computer for soft proofing system 82. Administrative computer 82 may serve up images to imaging stations 10A–10D (hereafter imaging stations 10). Color specialists at imaging stations 10 can inspect the images, and possibly provide feedback by marking or highlighting the images and retuning marked-up copies to administrative computer 82. Upon receiving feedback, an administrator may implement changes to the image using administrative computer 82. Once the administrator and the reviewers associated with imaging stations 10 reach agreement on the appearance of the color image, the image can be printed via a printing press or another high quality printing device.

Administrative computer 82 may be directly coupled to the various imaging stations 10, possibly forming a local area network (LAN), or alternatively, the administrative computer 82 may be coupled to imaging stations 10 via a wide area network or a global network 84 such as the Internet. The various imaging stations 10 may implement one or more of the calibration techniques described above in order to improve calibration and thus improve color accuracy. Indeed, improved calibration can directly impact the ability to achieve an effective soft proofing system 80 or another color intensive application.

In one embodiment, imaging stations 10 collectively define a set of CRTs, with each CRT in the set being calibrated to within the errors outlined above. In that case, it can be ensured that drift in the CRT of any imaging station 10 is adequately accounted for, such that contract proof color quality can be rendered at each imaging station 10.

Many aspects of the invention have been described as being at least partially implemented in software. Alternatively, exemplary hardware implementations may include implementations within a DSP, an application specific integrated circuit (ASIC), a field programmable gate array (FPGA), a programmable logic device, specifically designed hardware components, or any combination thereof.

Although many aspects of the invention have been described in the context of a calibration technique for calibrating a display device in the form of a cathode ray tube, aspects of the invention may be readily applicable to calibration of other imaging devices, including liquid crystal displays, plasma displays, various printing devices, or other imaging devices such as scanner or the like. Accordingly, other implementations and embodiments are within the scope of the following claims.

What is claimed is:

1. A method of calibrating an imaging device comprising:
   characterizing the imaging device with a device model such that an average error between expected outputs determined from the device model and measured outputs of the imaging device is on the order of an expected error; and
   adjusting image rendering on the imaging device to achieve a target behavior.

2. The method of claim 1, wherein measured outputs define a subset of device values substantially corresponding to neutral colors.

3. The method of claim 2, wherein the imaging device comprises a cathode ray tube, and wherein neutral colors have substantially equivalent red, green and blue device values.

4. The method of claim 1, wherein adjusting image rendering comprises adjusting image data applied to the imaging device.

5. The method of claim 4, wherein adjusting image data further includes creating entries for a lookup table (LUT) based on the device model.

6. The method of claim 4, wherein adjusting image data further includes creating a color profile for the imaging device based on the device model.

7. The method of claim 1, wherein the device model has one or more adjustable parameters, the method further comprising characterizing the imaging device with the device model by choosing values for the adjustable parameters of the device model.

8. The method of claim 7, wherein a number of the adjustable parameters is less than a number of measured outputs of the imaging device.

9. The method of claim 7, wherein the imaging device is a cathode ray tube and the adjustable parameters comprise a gamma value and a black onset value.

10. The method of claim 1, wherein the imaging device is a cathode ray tube and the target behavior corresponds to a defined gamma value.

11. A method of calibrating an imaging device comprising:
characterizing the imaging device with a device model having a set of adjustable parameters;
measuring color output from the imaging device; and
reducing error between the measured color output and expected color output as defined by the device model by adjusting the adjustable parameters of the device model such that an average error between the expected color output and the measured color output is on the order of an expected error.

12. The method of claim 11, wherein the imaging device is a cathode ray tube and the adjustable parameters include a gamma value and a black onset value.

13. A computer readable medium storing program code that when executed calibrates an imaging device by:
characterizing the imaging device with a device model such that an average error between expected outputs determined from the device model and measured outputs of the imaging device is on the order of an expected error; and
adjusting image rendering on the imaging device to a achieve a target behavior.

14. The computer readable medium of claim 13, wherein measured outputs define a subset of device values substantially corresponding to neutral colors.

15. The computer readable medium of claim 14, wherein the imaging device comprises a cathode ray tube, and wherein neutral colors have substantially equivalent red, green and blue device values.

16. The computer readable medium of claim 13, wherein adjusting image rendering comprises adjusting image data applied to the imaging device.

17. The computer readable medium of claim 16, wherein adjusting image data further includes creating entries for a lookup table (LUT) based on the device model.

18. The computer readable medium of claim 16, wherein adjusting image data further includes creating a color profile for the imaging device based on the device model.

19. The computer readable medium of claim 13, wherein the device model has one or more adjustable parameters, the method further comprising characterizing the imaging device with the device model by choosing values for the adjustable parameters of the device model.

20. The computer readable medium of claim 19, wherein a number of the adjustable parameters is less than a number of measured outputs of the imaging device.

21. The computer readable medium of claim 19, wherein the imaging device is a cathode ray tube and the adjustable parameters comprise a gamma value and a black onset value.

22. The computer readable medium of claim 13, wherein the imaging device is a cathode ray tube and the target behavior corresponds to a defined gamma value.

23. A computer readable medium storing program code that when executed calibrates an imaging device by:
characterizing the imaging device with a device model having a set of adjustable parameters;
measuring color output from the imaging device; and
reducing error between the measured color output and expected color output as defined by the device model by adjusting the adjustable parameters of the device model such that an average error between the expected color output and the measured color output is on the order of an expected error.

24. The computer readable medium of claim 23, wherein the imaging device is a cathode ray tube and the adjustable parameters include a gamma value and a black onset value.

* * * * *